(12) United States Patent
Zhao et al.

(10) Patent No.: US 9,736,426 B2
(45) Date of Patent: Aug. 15, 2017

(54) DATA INTERPOLATION

(71) Applicant: Empire Technology Development LLC, Wilmington, DE (US)

(72) Inventors: Ran Zhao, Beijing (CN); Qi Li, Beijing (CN); Xuefeng Song, Hebei (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 257 days.

(21) Appl. No.: 14/442,187

(22) PCT Filed: Jun. 5, 2014

(86) PCT No.: PCT/CN2014/079225
§ 371 (c)(1),
(2) Date: May 12, 2015

(87) PCT Pub. No.: WO2016/000093
PCT Pub. Date: Jan. 7, 2016

(65) Prior Publication Data
US 2016/0295159 A1    Oct. 6, 2016

(51) Int. Cl.
*H04N 9/31*      (2006.01)
*H04N 21/462*    (2011.01)
(Continued)

(52) U.S. Cl.
CPC ......... *H04N 7/0135* (2013.01); *G06T 3/4007* (2013.01); *H04N 7/0117* (2013.01); *H04N 21/462* (2013.01); *H04N 9/3188* (2013.01)

(58) Field of Classification Search
CPC .. H04N 7/0177; H04N 7/0135; H04N 9/3188; H04N 21/462; G06T 3/4007
See application file for complete search history.

(56) References Cited

U.S. PATENT DOCUMENTS 6,236,766 B1    5/2001   Zavaljevski et al.
8,867,858 B2   10/2014   Fattal et al.
(Continued)

FOREIGN PATENT DOCUMENTS

CN    101984668 A    3/2011
CN    102436484 A    5/2012
CN    102770887 A   11/2012

OTHER PUBLICATIONS

Dæhlen, M., and Floater, M., "Iterative polynomial interpolation and data compression," Numerical Algorithms, vol. 5, Issue 3, pp. 165-177 (1993).

(Continued)

*Primary Examiner* — Yubin Hung
(74) *Attorney, Agent, or Firm* — Brundidge & Stanger, P.C.

(57) ABSTRACT

When a picture displayed on a client device is enlarged, the client device may be configured to insert new pixels between two adjacent pixels in the picture. When actual values of the new pixels are stored on a server, the client device may submit a request to the server for actual values of the new pixels. Responsive to the request, the server may first calculate interpolation values in accordance with the same interpolation algorithm and then calculate a difference value based on the interpolation values and the actual values stored on the server. If the calculated difference value is greater than a threshold value, the server may transmit the actual values for the new pixels to the client device. Otherwise, the server may instruct the client device to calculate the interpolation values.

21 Claims, 4 Drawing Sheets (51) Int. Cl.
*G06T 3/40* (2006.01)
*H04N 7/01* (2006.01)

(56) References Cited

U.S. PATENT DOCUMENTS

| | | |
|---|---|---|
| 2002/0159653 A1 | 10/2002 | Dekel et al. |
| 2003/0005140 A1 | 1/2003 | Dekel et al. |
| 2007/0174489 A1 | 7/2007 | Iwabuchi |
| 2007/0274400 A1* | 11/2007 | Murai ............ H04N 21/234309 375/240.26 |
| 2008/0285892 A1* | 11/2008 | Sposato ................. G06T 11/60 382/311 |
| 2009/0052800 A1* | 2/2009 | Aso ......................... G06T 5/006 382/275 |
| 2009/0207248 A1 | 8/2009 | Cilia et al. |
| 2010/0134633 A1 | 6/2010 | Engeli et al. |
| 2011/0119488 A1* | 5/2011 | Jakobsson ............. H04L 9/3013 713/168 |
| 2013/0155272 A1* | 6/2013 | Imade ................... G06T 3/4007 348/222.1 |
| 2013/0329064 A1* | 12/2013 | Price .................... H04N 19/132 348/208.6 |
| 2014/0043351 A1* | 2/2014 | Karlov ................. G06T 3/4007 345/589 |

OTHER PUBLICATIONS

Friendly, M., et al., "Milestones in the history of thematic cartography, statistical graphics, and data visualization," 13th International Conference on Database and Expert Systems Applications (DEXA 2002), Aix En Provence, pp. 1-79 (Aug. 24, 2009).

International Search Report and Written Opinion for PCT/CN2014/079225, mailed on Mar. 2, 2015.

Liu, Z., et al., "imMens: Real-time visual querying of Big Data," Eurographics Conference on Visualization (EuroVis), vol. 32, No. 3, pp. 421-430 (2013).

Meyerovich, L.A., et al., "Superconductor: A language for Big Data visualization ," Workshop on Leveraging Abstractions and Semantics in High-Performance Computing, pp. 1-2, (Feb. 24, 2013).

* cited by examiner

DATA INTERPOLATION

CROSS-REFERENCE TO RELATED APPLICATION

This Application is the U.S. National Stage filing under 35 U.S.C. §371 of International Application No. PCT/CN14/079225, filed on Jun. 5, 2014. The disclosure of the International Application is hereby incorporated herein by reference in its entirety.

TECHNICAL FIELD

The technologies described herein pertain generally to data interpolation in digital image processing.

BACKGROUND

Unless otherwise indicated herein, the approaches described in this section are not prior art to the claims in this application and are not admitted to be prior art by inclusion in this section.

When a user enlarges a picture displayed on a client device, the client device may insert one or more new pixels between adjacent pixels in the picture. In some examples, values of the new pixels are stored on the client device; alternatively, if the values are missing or otherwise not available for interpolation, the client device may calculate the values of the new pixels based on one or more currently existing interpolation algorithms, e.g., linear interpolation.

SUMMARY

Technologies are generally described for data interpolation. The various techniques described herein may be implemented in various methods, systems, computer programmable products, and/or computer-readable medium.

Some example embodiments may be implemented as methods, which may include, at least, calculating an interpolation value for a pixel to be inserted between two adjacent pixels that are displayed at a client device; calculating a difference value between the interpolation value and a pixel value that is stored on a server; transmitting the pixel value to the client device, responsive to determination that the calculated difference value is greater than a threshold value; and instructing the client device to calculate the interpolation value for the pixel to be inserted between the two adjacent pixels, responsive to determination that the calculated difference value is less than the threshold value.

Some example embodiments may be implemented as systems, which may include, at least, a client device configured to display an image that includes at least two adjacent pixels, receive an instruction to magnify the image, and submit a request for a pixel value for a pixel to be inserted between the two adjacent pixels; and a server configured to receive the request, from the client device, for the pixel value, calculate an interpolation value for the pixel in accordance with an interpolation algorithm, calculate a difference value between the calculated interpolation value and the pixel value, transmit the pixel value to the client device, responsive to determination that the calculated difference value is greater than a threshold value, and instruct the client device to calculate the interpolation value for the pixel to be inserted between the two adjacent pixels, responsive to determination that the calculated difference value is less than the threshold value.

Some example embodiments may be implemented as computer-readable mediums having executable instructions stored thereon that, when executed, cause one or more processors to perform operations comprising receiving a request, from a client device, for pixel values for multiple pixels to be inserted between two adjacent pixels, wherein the two adjacent pixels are displayed at the client device, and wherein the pixel values are stored on a server; calculating interpolation values for the pixels in accordance with an interpolation algorithm; calculating a difference value between the calculated interpolation values and the pixel values; transmitting the pixel values to the client device, responsive to determination that the calculated difference value is greater than a threshold value; and instructing the client device to calculate the interpolation values for the pixels to be inserted between the two adjacent pixels, responsive to determination that the calculated difference value is less than the threshold value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings, in which:

DETAILED DESCRIPTION

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

As referenced herein, a "pixel" may refer to a picture element of a digital image. Each pixel may have one or more components that describe color, brightness, or gray levels of the pixel. For example, a pixel of a color image may include three components, e.g., red, green, and blue. Each of the three components has a value that indicates the intensity of red, green, and blue. Accordingly, the color information of the pixel may be represented in an array of values.

Briefly stated, when a digital image displayed on a client device is to be enlarged, the client device may insert one or more new pixels between any adjacent original pixels in the digital image. Actual values of the new pixels may be stored on the client device, in which case the client device may simply assign the actual values to the new pixels. When the actual values of the new pixels are not available on the client device, the client device may calculate interpolation values for the new pixels based on the values of the adjacent original pixels in accordance with an interpolation algorithm. Alternatively, if the actual values are stored on a server, the client device may submit a request to the server for actual values of the new pixels.

Responsive to the request, the server may first calculate interpolation values in accordance with the same interpolation algorithm, and then calculate a difference value based on the interpolation values and the actual values stored on the server. If the calculated difference value is greater than a threshold value, the server may transmit the actual values for the new pixels to the client device. If the calculated difference value is less than the threshold value, the server may instruct the client device to calculate the interpolation values and to assign the interpolation values to the new pixels to save network bandwidth between the server and the client device or to save computing resources of the server.

Figure 1:
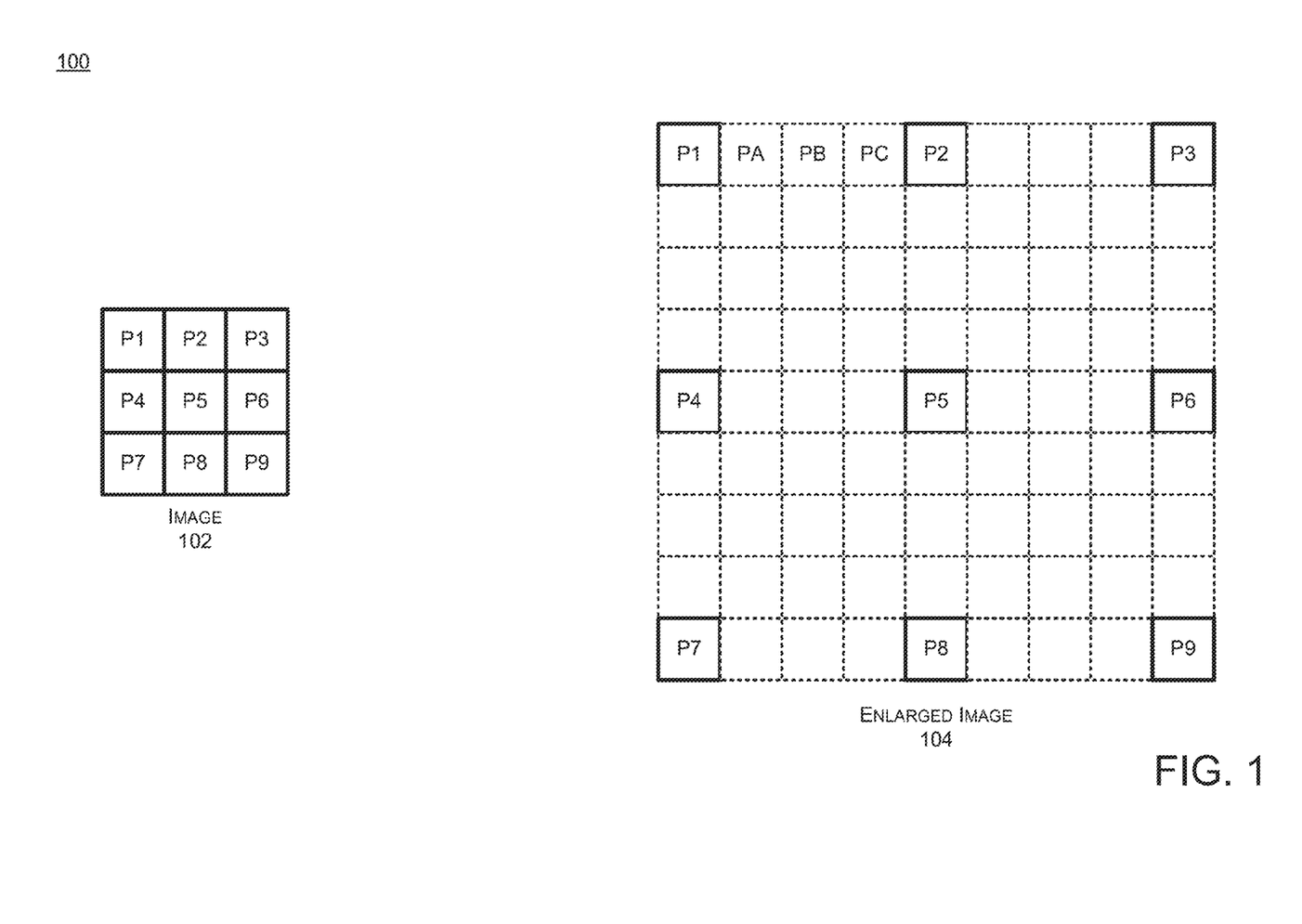
FIG. 1 shows example images to which data interpolation may be implemented.

FIG. 1 shows example images to which data interpolation may be implemented, all arranged in accordance with at least some embodiments describe herein. As depicted, an image 102 may be enlarged to be enlarged image 104.

Image 102 may refer to a digital image that includes one or more pixels. For each of the pixels, the color information, e.g., RGB color, gray levels, or simply black or white, may be digitized into an array of values. Although image 102 is simplified as a 3×3 image in FIG. 1, one skilled in the art will appreciate there may be more or fewer pixels in image 102. As shown in FIG. 1, P1, P2, P3, P4, P5, P6, P7, P8, and P9 ("original pixels" hereafter) may respectively represent each of the nine pixels in the 3×3 image. Image 102 may be variably enlarged as enlarged image 104 in accordance with user inputs, such as mouse/keyboard inputs and/or gestures, to resize image 102.

Enlarged image 104 may refer to an enlarged digital version of image 102. Enlarged image 104 may have more pixels than image 102 at the vertical and/or horizontal direction. That is, although enlarged image 104 is shown as a 9×9 image in FIG. 1, one skilled in the art will appreciate there may be pixels of other numbers in enlarged image 104, e.g., 9×7, 2×4, etc., depending on the user inputs, e.g., mouse/keyboard inputs and/or gestures, to resize image 102.

When image 102 is enlarged, the original pixels in image 102, e.g., P1-P9, may be correspondingly positioned in enlarged image 104 and, further, one or more new pixels may be inserted to fill the space between any two adjacent ones of original pixels P1-P9. For example, new pixels PA, PB, and PC may be inserted between adjacent original pixels P1 and P2. Actual values of the new pixels may be retrieved from a local storage device or from a server. Alternatively, the values of the new pixels may be calculated by a client device in accordance with one of currently existing interpolation algorithms.

As referenced herein, an interpolation algorithm may refer to a method for calculating pixel values based on the values of existing pixels. For examples, the values of new PA, PB, and PC may be calculated based on the values of adjacent original pixels P1 and P2 in accordance with an interpolation algorithm.

Figure 2:
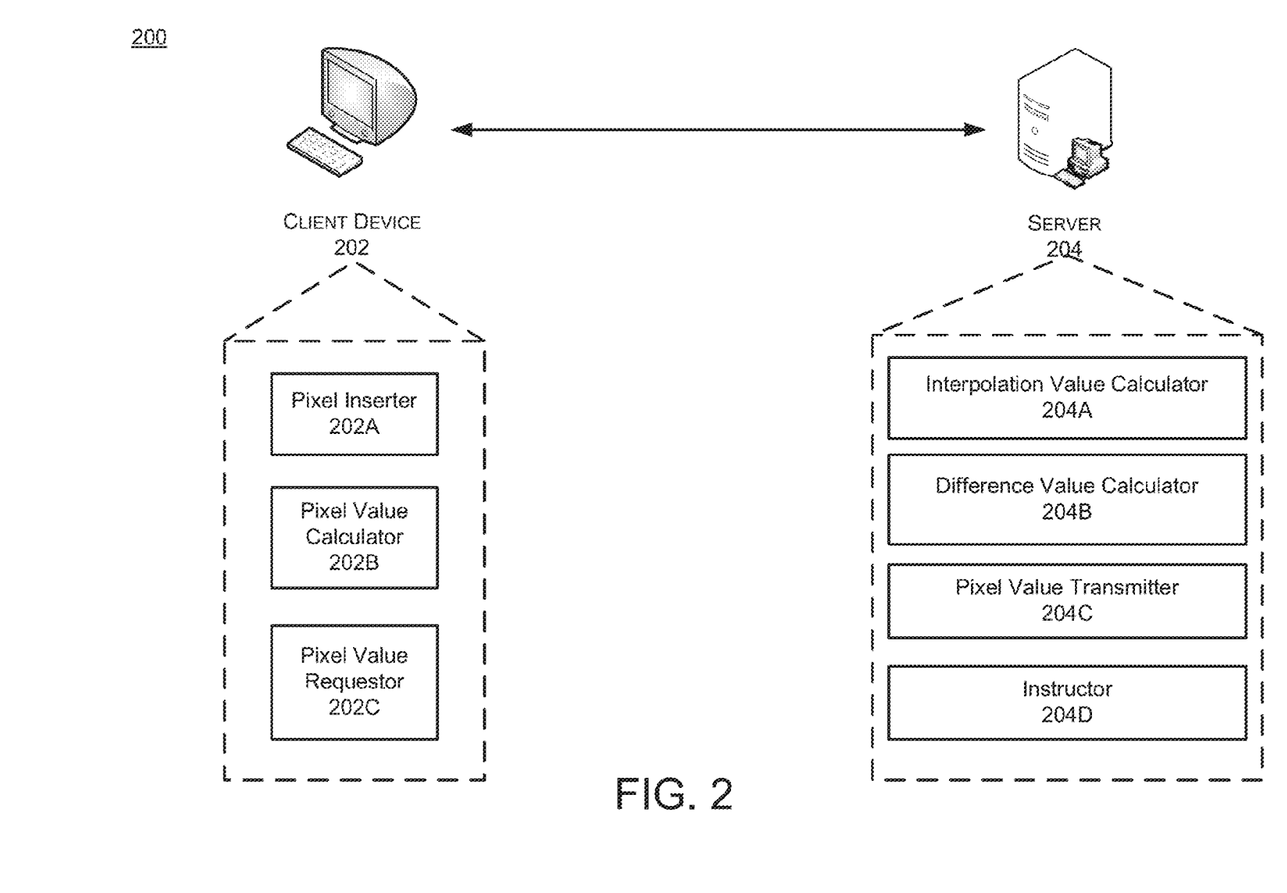
FIG. 2 shows an example system by which data interpolation may be implemented.

FIG. 2 shows an example system 200 by which data interpolation may be implemented, all arranged in accordance with at least some embodiments describe herein. As depicted, example system 200 may, at least, include a client device 202 and a server 204. Client device 202 may further include, at least, a pixel inserter 202A, a pixel value calculator 202B, and a pixel value requestor 202C. Server 204 may further include, at least, an interpolation value calculator 204A, a difference value calculator 204B, a pixel value transmitter 204C, and an instructor 204D.

Client device 202 may refer to a general purpose computing device that includes processors, storage devices, communication ports, input devices, and/or display devices. At least one of the display devices may be configured to display image 102. Non-limiting examples of client device 202 may include desktop computers, laptops, tablets, smartphones, etc.

Pixel inserter 202A may refer to a component that may be configured to insert new pixels between any adjacent original pixels of image 102 when image 102 is to be enlarged. In at least some examples, pixel inserter 202A may be implemented as hardware, software, firmware, or any combination thereof.

Pixel value calculator 202B may refer to a component that may be configured to calculate interpolation values for new pixels inserted between any of the adjacent original pixels. In at least some embodiments, pixel value calculator 202B may be implemented as hardware, software, firmware, or any combination thereof.

Pixel value requestor 202C may refer to a component that may be configured to submit a request for the actual values of the new pixels to server 204. In at least some embodiments, pixels value requestor 202C may be implemented as hardware, software, firmware, or any combination thereof.

In response to user input received via an input device corresponding to client device 202, client device 202 may accordingly enlarge image 102 to be enlarged image 104. That is, pixel inserter 202A may insert one or more new pixels between any adjacent original pixels of image 102.

When the actual values of the new pixels are stored locally on the storage devices of client device 202, client device 202 may retrieve the actual values from the storage devices and render the new pixels with color information included in the actual values.

In some other examples, the actual values of the new pixels may be missing or otherwise not available to client device 202. Pixel value calculator 202B may then calculate the values for each of the new pixels in accordance with one of currently existing interpolation algorithms ("interpolation values" hereafter).

When the actual values of the new pixels are stored on server 204, pixel value requestor 202C may be configured to transmit a request to server 204 for the values of the new pixels.

Server 204 may refer to a general purpose computing device communicatively coupled to client device 202 via a network or one or more network connections. In some examples, server 204 may receive the request for the actual values of the new pixels from pixel value requestor 202C.

In general, server 204 may be configured to transmit the actual values of the new pixels to client device 202 when server 204 deems that the interpolation values are sufficiently different from the actual values of the new pixels. Otherwise, server 204 may be configured to instruct client device 202 to calculate the interpolation values of the new pixels. The determination is described in greater detail below.

Interpolation value calculator 204A may refer to a component that may be configured to calculate interpolation values of each of the new pixels in response to the request submitted by pixel value requestor 202C. Such calculation may be conducted in accordance with an interpolation algorithm that is executed by pixel value calculator 202B. The interpolation values may be further transmitted to difference value calculator 204B. In at least some examples, interpolation value calculator 204A may be implemented as hardware, software, firmware, or any combination thereof.

Difference value calculator 204B may refer to a component that may be configured to calculate a difference value between the calculated interpolation values and the actual values, for each of the new pixels, stored on server 204. In at least some examples, the difference value may be calculated in accordance with the formula:

$$D = \sum_{i=1}^{n} (E_i - P'_i)^2$$

in which D represents the difference value, $E_i$ (i=1, ..., n) represent the calculated interpolation values, and $P'_i$ (i=1, ..., n) represent the actual values that are stored on server 204. Thus, the calculated difference value may indicate how different the calculated interpolation values are from the actual values of the new pixels. If the calculated interpolation values are similar to the stored actual values, server 204 may instruct client device 202 to calculate the interpolation values to save some bandwidths. The determination of the difference/similarity is described in greater detail below.

In particular, server 204 may be configured to compare the calculated difference value to a threshold value to determine the similarity between the interpolation values and the actual values of the new pixels. The threshold value may be predetermined by a system administrator that takes multiple factors into consideration. Such factors may include network bandwidth between client device 202 and server 204, a graphic processing capability of client device 202, and/or memory size of client device 202. For example, if the network bandwidth is sufficient for transmission of the stored actual values of the new pixels without creating noticeable latency to the user of client device 202 who may be a viewer of image 102, the system administrator may lower the threshold value. As the threshold value is lowered, server 204 is more likely to transmit the actual values than to instruct client device 202 to calculate the interpolation values. In most cases, the system administrator may adjust the threshold value in accordance with user experience regarding the latency when image 102 is enlarged.

Based on the comparison result, the actual values of the new pixels may be transmitted to client device 202 if the calculated difference value is greater than the threshold value. Otherwise, client device 202 may be instructed to calculate the interpolation values if the calculated difference value is less than the threshold value. In some examples, server 204 may instruct client device 202 to calculate the interpolation values for the new pixels and transmit the actual values to replace the interpolation values after a passage of time.

In at least some examples, difference value calculator 204B may be implemented as hardware, software, firmware, or any combination thereof.

Pixel value transmitter 204C may refer to a component that may be configured to transmit the actual values stored on server 204 to client device 202 if the difference value is greater than the threshold value. In at least some examples, pixel value transmitter 204C may be implemented as hardware, software, firmware, or any combination thereof.

Instructor 204D may refer to a component that may be configured to instruct pixel value calculator 202B to calculate the interpolation values for the new pixels if the difference value is less than the threshold value. In at least some examples, instructor 204D may be implemented as hardware, software, firmware, or any combination thereof.

Figure 3:
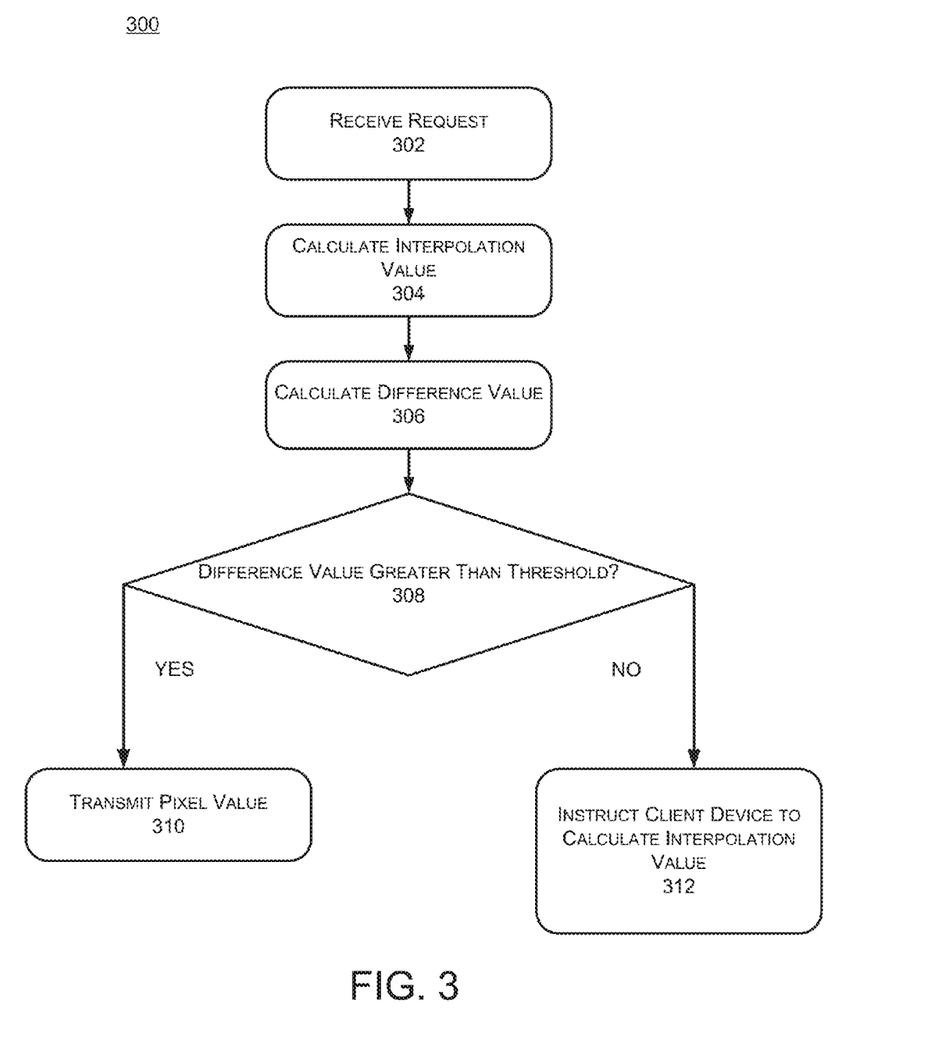
FIG. 3 shows an example configuration of a processing flow of operations by which data interpolation may be implemented.

FIG. 3 shows an example configuration of a processing flow of operations by which data interpolation may be implemented, all arranged in accordance with at least some embodiments describe herein. As depicted, processing flow 300 may include sub-processes executed by various components that are part of example system 200. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, 310, and/312. Processing may begin at block 302.

Block 302 (Receive Request) may refer to server 304 receiving a request, from client device 202, for actual values for each of the new pixels to be inserted between two original pixels of image 102. In at least some examples, such request may include the values of any two adjacent original pixels such that the interpolation values may be calculated accordingly. Block 302 may be followed by block 304.

Block 304 (Calculate Interpolation Value) may refer to interpolation value calculator 204A calculating interpolation values of the new pixels in response to the request submitted by pixel value requestor 202C. Such calculation may be conducted in accordance with an interpolation algorithm that is adopted by pixel value calculator 202B. The interpolation values may be further transmitted to difference value calculator 204B. Block 304 may be followed by block 306.

Block 306 (Calculate Difference Value) may refer to difference value calculator 204B calculating a difference value between the calculated interpolation values and the actual values stored on server 204. In at least some examples, the difference value may be calculated in accordance with the formula:

$$D = \sum_{i=1}^{n} (E_i - P'_i)^2$$

in which D represents the difference value, $E_i$ (i=1, ..., n) represent the calculated interpolation values, and $P'_i$ (i=1, ..., n) represent the actual values that are stored on server 204. Block 306 may be followed by decision block 308.

Decision block 308 (Difference Value Greater than Threshold?) may refer to server 204 comparing the calculated difference value to a threshold value to determine the similarity between the interpolation values and the actual values of the new pixels. The threshold value may be predetermined by a system administrator considering multiple factors. Such factors may include network bandwidth between client device 202 and server 204, a graphic processing capability of client device 202, and/or memory size of client device 202. For example, if the network bandwidth is sufficient for transmission of the stored actual values of the new pixels without creating noticeable latency to a viewer of image 102, the system administrator may lower the threshold value. As the threshold value is lowered, server 204 is more likely to transmit the actual values than to instruct client device 202 to calculate the interpolation values. In most cases, the system administrator may adjust the threshold value in accordance with user experience regarding the latency when image 102 is enlarged. If yes, decision block 308 may be followed by block 310. If not, decision block 308 may be followed by block 312.

Block 310 (Transmit Pixel Value) may refer to pixel value transmitter 204C transmitting the actual values stored on server 204 to client device 202 if the difference value is greater than the threshold value.

Block 312 (Instruct Client Device to Calculate Interpolation Value) may refer to instructor 204D instructing pixel value calculator 202B to calculate the interpolation values for each of the new pixels if the difference value is less than the threshold value.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
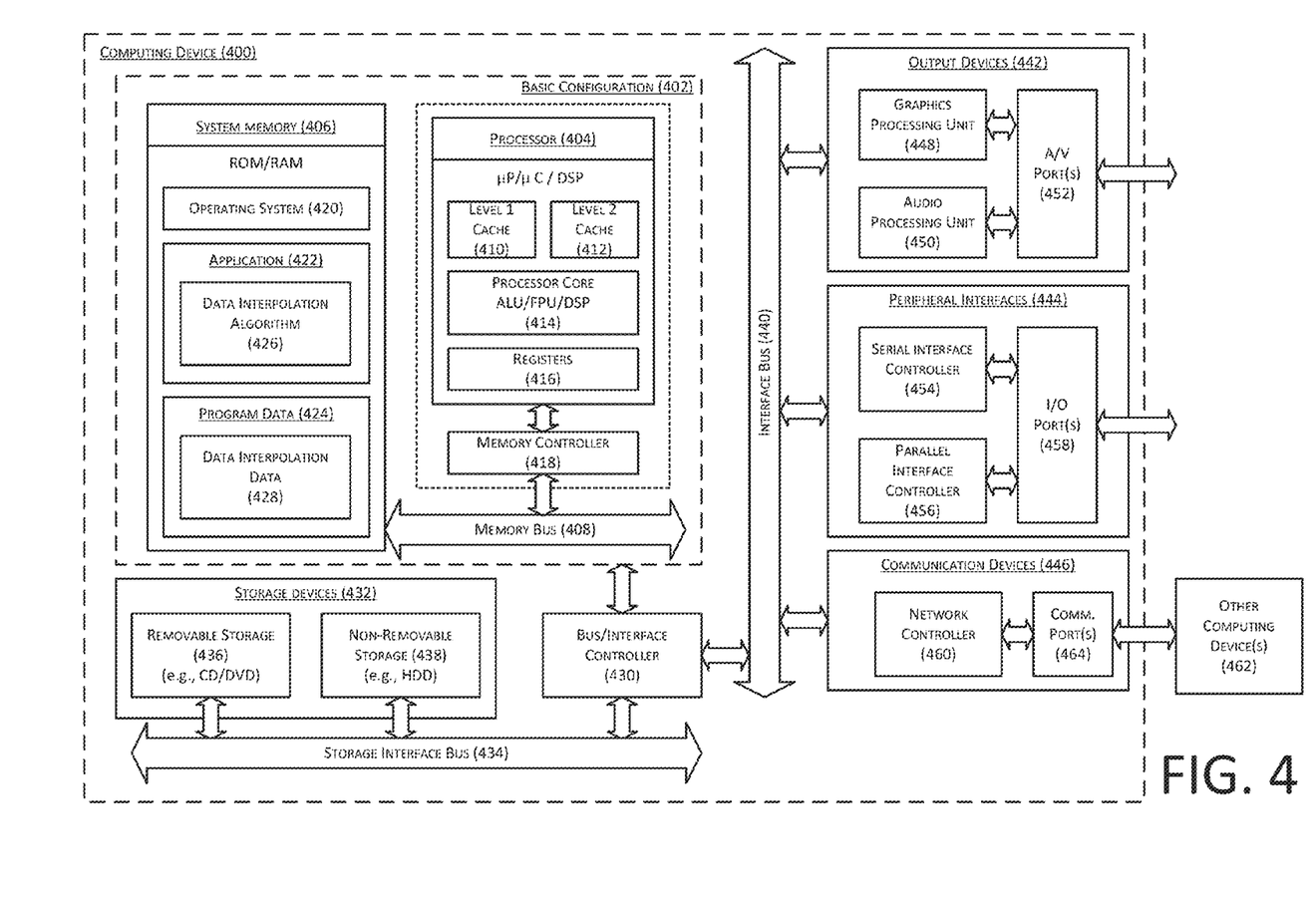
FIG. 4 shows a block diagram illustrating an example computing device that is arranged for data interpolation, all arranged in accordance with at least some embodiments describe herein.

FIG. 4 shows a block diagram illustrating an example computing device that is arranged for data interpolation, all arranged in accordance with at least some embodiments describe herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations, memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a data interpolation algorithm 426 that is arranged to perform the functions as described herein including those described with respect to process 300 of FIG. 3. Program data 424 may include data interpolation data 428 that may be useful for operation with data interpolation algorithm 426 as is described herein. In some embodiments, application 422 may be arranged to operate with program data 424 on operating system 420 such that implementations of data interpolation may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for conditional buffering, the method comprising:
    calculating an interpolation value for a pixel to be inserted between two adjacent pixels that are displayed at a client device;
    calculating a difference value between the calculated interpolation value and a pixel value that is stored on a server;
    transmitting the pixel value to the client device, responsive to a determination that the calculated difference value is greater than a threshold value; and
    instructing the client device to calculate the interpolation value for the pixel to be inserted between the two adjacent pixels, responsive to a determination that the calculated difference value is less than the threshold value.

2. The method of claim 1, further comprising determining the threshold value based on factors that include network bandwidth between the client device and the server, a graphic processing capability of the client device, or memory size of the client device.

3. The method of claim 1, wherein the calculating the difference value includes:
    subtracting the calculated interpolation value from the pixel value; and
    calculating a square value for a result of the subtraction as the difference value.

4. The method of claim 1, further comprising receiving a request for the pixel value of the pixel via one or more network connections.

5. The method of claim 1, wherein the calculating the interpolation value is in accordance with an interpolation algorithm adopted by both the client device and the server.

6. The method of claim 1, further comprising transmitting the pixel value to replace the calculated interpolation value subsequent to the pixel being inserted between the two adjacent pixels.

7. A system, comprising:
a client device configured to:
   display an image that includes at least two adjacent pixels,
   receive an instruction to magnify the image, and
   submit a request for a pixel value for a pixel to be inserted between the at least two adjacent pixels; and
a server configured to:
   receive the request, from the client device, for the pixel value,
   calculate an interpolation value for the pixel in accordance with an interpolation algorithm,
   calculate a difference value between the calculated interpolation value and the pixel value,
   transmit the pixel value to the client device, responsive to a determination that the calculated difference value is greater than a threshold value, and
   instruct the client device to calculate the interpolation value for the pixel to be inserted between the at least two adjacent pixels, responsive to a determination that the calculated difference value is less than the threshold value.

8. The system of claim 7, wherein the threshold value is determined based on factors that include network bandwidth between the client device and the server, a graphic processing capability of the client device, or memory size of the client device.

9. The system of claim 7, wherein the difference value is calculated by:
   subtraction of the interpolation value from the pixel value, and
   calculation of a square value for a result of the subtraction, as the difference value.

10. The system of claim 7, wherein the client device is configured to calculate the interpolation value in accordance with the interpolation algorithm.

11. The system of claim 7, wherein the client device and the server are in a cloud-based computing environment.

12. The system of claim 7, wherein the server is configured to transmit the pixel value to the client device prior to receipt of the request.

13. The system of claim 7, wherein the difference value is calculated by
   subtraction of the interpolation value from the pixel value, and
   calculation of an absolute value for a result of the subtraction.

14. A non-transitory computer-readable medium, hosted by a service provider, that stores instructions that, when executed, cause one or more processors to perform operations comprising:
   receiving a request, from a client device, for pixel values for multiple pixels to be inserted between two adjacent pixels,
      wherein the two adjacent pixels are displayed at the client device, and
      wherein the pixel values are stored on a server;
   calculating interpolation values for the pixels in accordance with an interpolation algorithm;
   calculating a difference value between the calculated interpolation values and the pixel values;
   transmitting the pixel values to the client device, responsive to a determination that the calculated difference value is greater than a threshold value; and
   instructing the client device to calculate the interpolation values for the pixels to be inserted between the two adjacent pixels, responsive to a determination that the calculated difference value is less than the threshold value.

15. The non-transitory computer-readable medium of claim 14, further comprising determining the threshold value based on factors that include network bandwidth between the client device and the server, a graphic processing capability of the client device, or memory size of the client device.

16. The non-transitory computer-readable medium of claim 14, wherein the calculation of the difference value includes:
   with respect to each of the pixels, subtract corresponding one of the interpolation values from corresponding one of the pixel values;
   calculate a square value for each of the pixels; and
   sum up the square values of the pixels.

17. The non-transitory computer-readable medium of claim 14, wherein the interpolation algorithm is adopted by both the server and the client device.

18. The non-transitory computer-readable medium of claim 14, further comprising transmitting the pixel values to replace the calculated interpolation values subsequent to the pixels being inserted between the two adjacent pixels.

19. The non-transitory computer-readable medium of claim 14, wherein the client device and the server are in a cloud-based computing environment.

20. The non-transitory computer-readable medium of claim 14, further comprising transmitting the pixel values to the client device prior to receipt of the request.

21. The non-transitory computer-readable medium of claim 14, wherein the calculation of the difference value includes:
   with respect to each of the pixels, subtract corresponding one of the interpolation values from corresponding one of the pixel values;
   calculate an absolute value for each of the pixels; and
   sum up the absolute values of the pixels.

* * * * *